(12) United States Patent
Llach et al.

(10) Patent No.: US 7,889,939 B2
(45) Date of Patent: Feb. 15, 2011

(54) TECHNIQUE FOR SIMULATING FILM GRAIN USING FREQUENCY FILTERING

(75) Inventors: Joan Llach, Princeton, NJ (US); Jill MacDonald Boyce, Manalapan, NJ (US); Alexandros Tourapis, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1153 days.

(21) Appl. No.: 10/571,148

(22) PCT Filed: Sep. 22, 2004

(86) PCT No.: PCT/US2004/030950

§ 371 (c)(1),
(2), (4) Date: Mar. 9, 2006

(87) PCT Pub. No.: WO2005/032143

PCT Pub. Date: Apr. 7, 2005

(65) Prior Publication Data

US 2007/0036452 A1    Feb. 15, 2007

Related U.S. Application Data

(60) Provisional application No. 60/505,260, filed on Sep. 23, 2003.

(51) Int. Cl.
G06K 9/40 (2006.01)
G06T 5/00 (2006.01)
H04N 17/00 (2006.01)
H04N 17/02 (2006.01)

(52) U.S. Cl. .................. 382/254; 382/260; 382/275; 358/3.26; 358/3.27; 348/193

(58) Field of Classification Search .................. 382/254, 382/275
See application file for complete search history.

(56) References Cited

U.S. PATENT DOCUMENTS 4,935,816 A    6/1990    Faber (Continued)

FOREIGN PATENT DOCUMENTS

EP    0622000    10/1992

(Continued)

OTHER PUBLICATIONS

Search Report dated Dec. 17, 2004.

(Continued)

*Primary Examiner*—Bhavesh M Mehta
*Assistant Examiner*—Jose M Torres
(74) *Attorney, Agent, or Firm*—Robert D. Shedd; Robert B. Levy; Jorge Tony Villabon

(57) ABSTRACT

Simulation of film grain in an image can occur by compressing a video image, then transmitting compressed video together with a message containing at least one parameter indicative of the original film grain, to a decoder, and restoring the original grainy appearance of images by having the decoder simulating film grain based on the content of the film grain message. To improve efficiency, one or more parameters of film grain information undergo scaling in accordance with a target pixel block size for pixel blocks in the image. Such scaling allows for the use of conventional circuitry for performing block-based operations in connection with the film grain simulation.

17 Claims, 3 Drawing Sheets

U.S. PATENT DOCUMENTS

| | | | |
|---|---|---|---|
| 5,140,414 | A | 8/1992 | Mowry |
| 5,335,013 | A | 8/1994 | Faber |
| 5,374,954 | A | 12/1994 | Mowry |
| 5,406,326 | A | 4/1995 | Mowry |
| 5,457,491 | A | 10/1995 | Mowry |
| 5,471,572 | A | 11/1995 | Buchner et al. |
| 5,475,425 | A | 12/1995 | Przyborski et al. |
| 5,629,769 | A | 5/1997 | Cookingham et al. |
| 5,641,596 | A * | 6/1997 | Gray et al. ............... 430/21 |
| 5,687,011 | A | 11/1997 | Mowry |
| 5,709,972 | A | 1/1998 | Cookingham et al. |
| 5,767,860 | A | 6/1998 | Zimmer et al. |
| 5,831,673 | A | 11/1998 | Przyborski et al. |
| 6,587,509 | B1 * | 7/2003 | Suzuki et al. ......... 375/240.29 |
| 7,092,016 | B2 * | 8/2006 | Morton et al. ............. 348/241 |
| 7,245,783 | B2 * | 7/2007 | Fielding .................. 382/275 |
| 2002/0034337 | A1 | 3/2002 | Shekter |

FOREIGN PATENT DOCUMENTS

| | | |
|---|---|---|
| EP | 1175091 | 1/2002 |
| EP | 1215624 | 6/2002 |
| RU | 2 088 962 C1 | 8/1997 |
| WO | WO9314591 | 7/1993 |
| WO | WO9520292 | 7/1995 |
| WO | WO9722204 | 6/1997 |
| WO | WO0146992 | 6/2001 |
| WO | WO0177871 | 10/2001 |
| WO | WO2004104931 | 12/2004 |

OTHER PUBLICATIONS

Christina Gomila: "SEI message for film grain encoding: syntax and results" JVT of ISO IEC MPEG ITU-T VCEG JVT-1013 Revision 2, Sep. 2, 2003, pp. 1-11, XP002308743 San Diego, CA, USA p. 1, Line 1-p. 5, Last Paragraph.

Christina Gomila, Alexander Kobilansky: SEI Message for Film Grain Encoding JVT of iso iec mpeg and itu-t vceg JVT-H022, May 23, 2003, pp. 1-14, XP002308742 Geneva Switzerland abstract p. 2, paragraph 1-p. 6, last line: figures 1,2 p. 9, paragraph 2.

M. Schlockermann, S. Wittman, T. Wedi, S. Kadono: "Film grain coding in H. 264/AVC" JVT-1034d2, Sep. 2, 2003, pp. 1-8, XP002311238 San Diego, CA. USA p. 1, Line 1-p. 2, Last Line.

Office Action from U.S. Appl. No. 10/556,834 mailed Aug. 19, 2008.
Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Zhao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu, arce@ee.udel.edu, 2000.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Peng et al, "Adaptive Frequency Weighting for Fine-Granularity-Scalability," Visual Communications and Image Processing 2002, Proceedings of SPIE, vol. 4671, 2002 SPIE 0277-786X/02.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Efficient Video Coding with Hybrid Spatial and Fine-Grain SNR Scalabilities," Department of Electronic Engineering, Beijing Institute of Technology, China, 2002.

Yan et al, "Film Grain Noise Removal and Generation for Color Images," Department Electrical and Computer Engineers, University of Toronto, dimitris@comm.toronto.edu, 1998.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

* cited by examiner

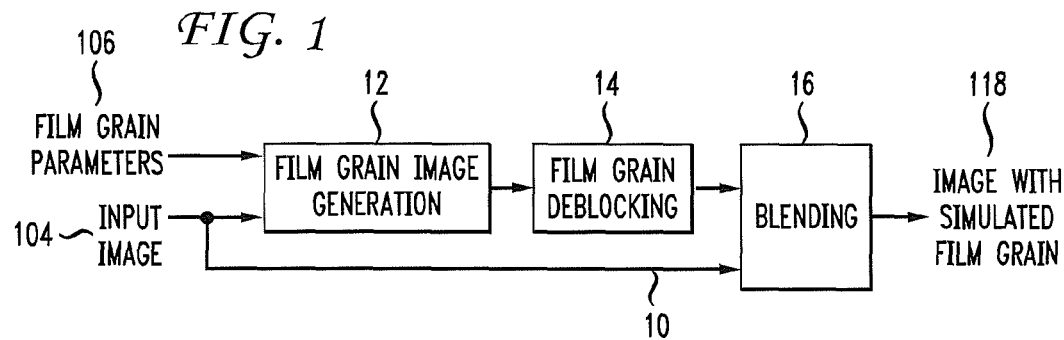
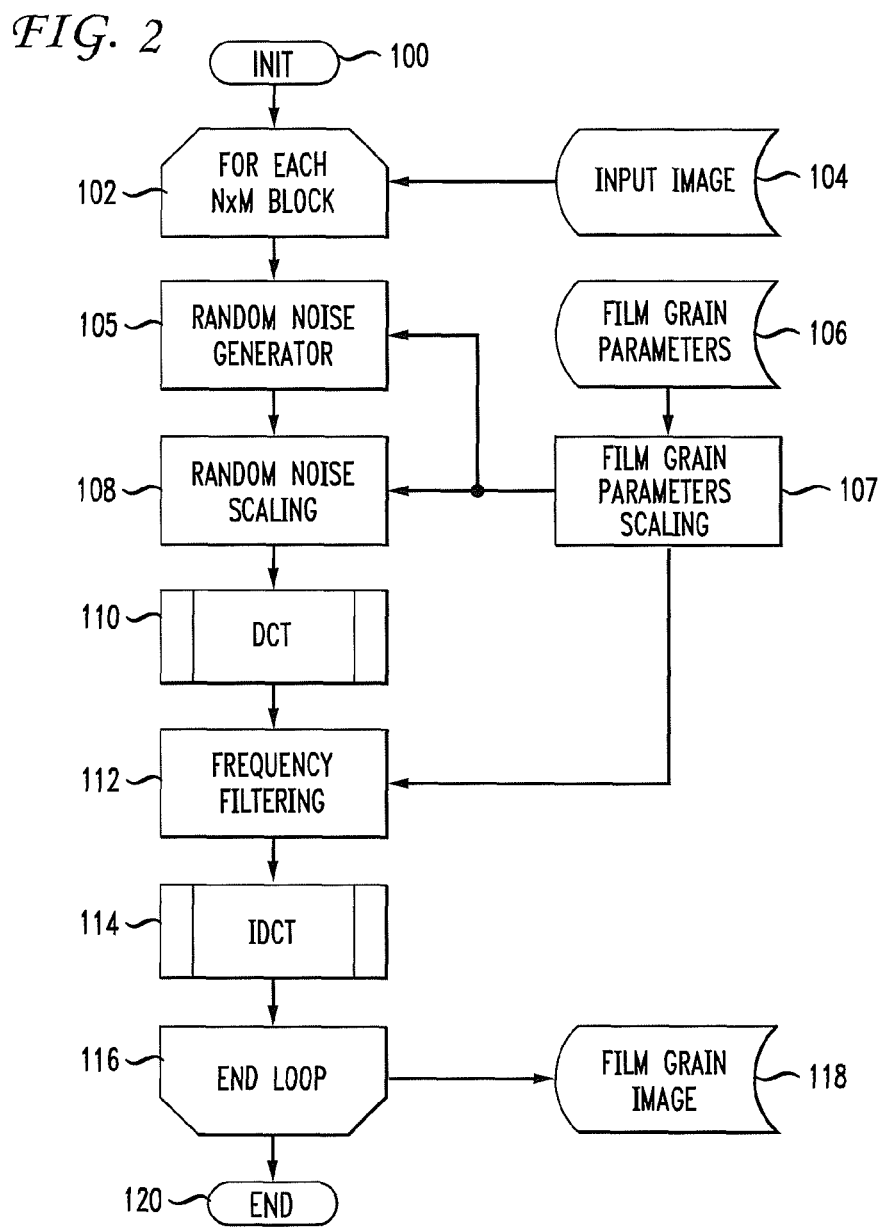

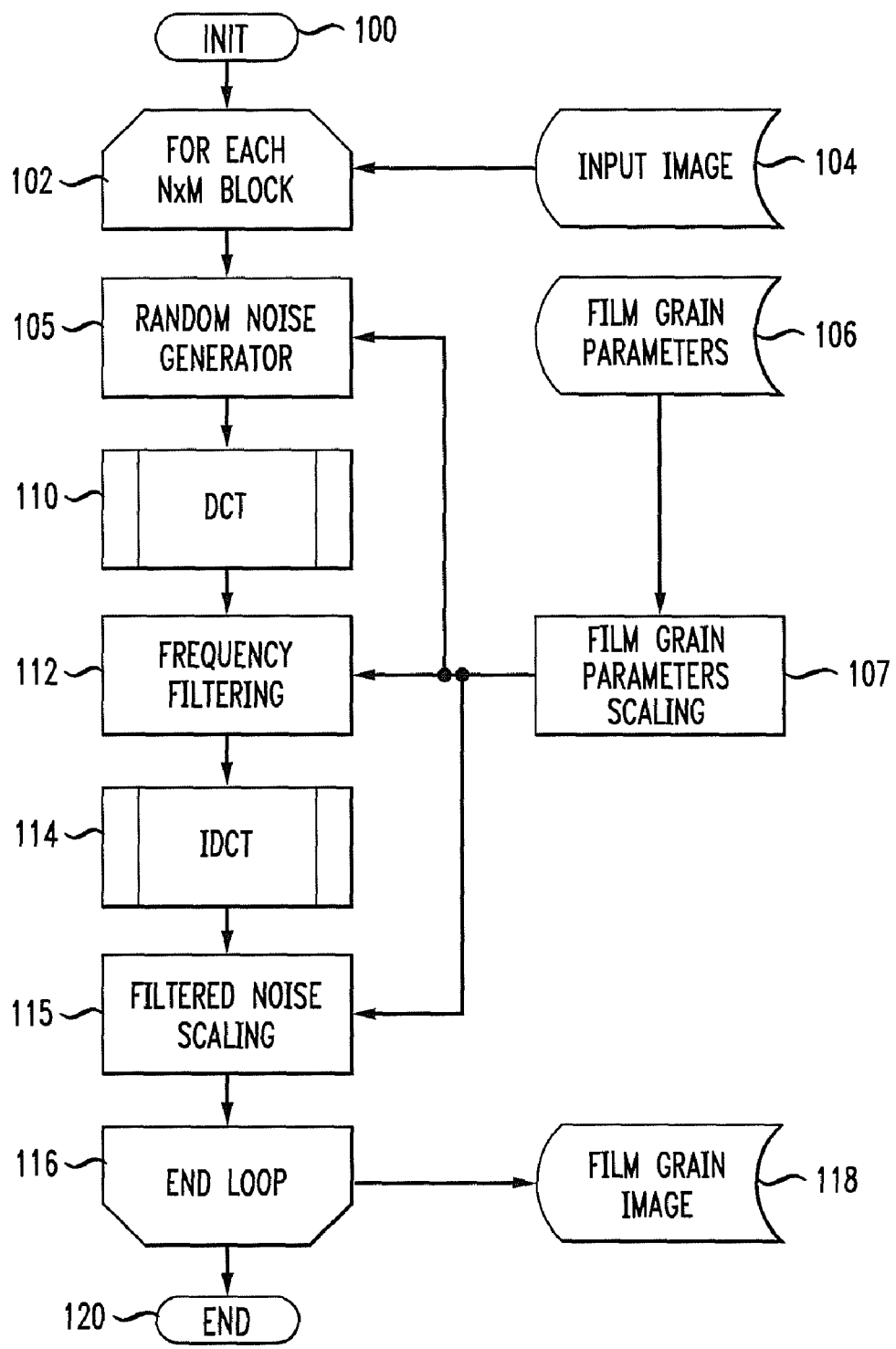

TECHNIQUE FOR SIMULATING FILM GRAIN USING FREQUENCY FILTERING

CROSS-REFERENCE TO RELATED APPLICATIONS

This application claims the benefit, under 35 U.S.C. §365 of International Application PCT/US2004/030950, filed Sep. 22, 2004, which was published in accordance with PCT Article 21(2) on Apr. 7, 2005 in English and which claims the benefit of U.S. provisional patent application No. 60/505,260, filed Sep. 23, 2003.

TECHNICAL FIELD

This invention relates to a technique for simulating film grain in a coded image following decoding.

BACKGROUND ART

Motion picture films comprise silver-halide crystals dispersed in an emulsion, which is coated in thin layers on a film base. The exposure and development of these crystals form the photographic image consisting of discrete tiny particles of silver. In color negatives, tiny blobs of dye occur on the sites where the silver crystals form following chemical removal of the silver during development of the film stock. These small specks of dye commonly bear the label 'grain' in color film. Grain appears randomly distributed on the resulting image because of the random formation of silver crystals on the original emulsion. Within a uniformly exposed area, some crystals develop after exposure while others do not.

Grain varies in size and shape. The faster the film, the larger the clumps of silver formed and blobs of dye generated, and the more they tend to group together in random patterns. The term "granularity" typically refers to the grain pattern. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in Standard Definition Television (SDTV) and becomes imperceptible in smaller formats.

Motion picture film typically contains image-dependent noise resulting either from the physical process of exposure and development of the photographic film or from the subsequent editing of the images. Photographic film possesses a characteristic quasi-random pattern, or texture, resulting from physical granularity of the photographic emulsion. Alternatively, simulation of similar pattern can occur in computed-generated images in order to blend them with photographic film. In both cases, this image-dependent noise bears the designation of "film grain." Quite often, moderate grain texture presents a desirable feature in motion pictures. In some instances, the film grain provides visual cues that facilitate the correct perception of two-dimensional pictures. Film grade often varies within a single film to provide various clues as to time reference, point of view, etc. Many other technical and artistic demands exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into natural scene. Cineon® from Eastman Kodak Co, Rochester N.Y., one of the first digital film applications to implement grain simulation, produces very realistic results for many grain types. However, the Cineon® application does not yield good performance for many high speed films because of the noticeable diagonal stripes the application produces for high grain size settings. Further, the Cineon® application fails to simulate grain with adequate fidelity when images become subject to prior processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

Film grain simulation continues to remain a topic of interest. Recently, the H.264 Video Compression standard underwent amendment to adopt a standard Supplemental Enhancement Information (SEI) message specifying film grain simulation parameters. The adoption of a specific format film grain SEI message will greatly facilitate the development of decoders for simulating film grain using a technique recently disclosed by the assignee of the instant application for simulating film grain. The technique developed by applicants' assignee simulates film grain by (1) first filtering grain out of images before compression, then (2) transmitting compressed video together with a message containing information about original grain to a decoder, and (3) restoring the original grainy appearance of images by having the decoder simulating film grain based on the content of the SEI message. This technique provides large bit-rate savings for high quality applications requiring the film grain preservation. However, the technique increases decoder complexity since film grain generation requires the creation of the film grain image by operating on blocks of 16×16 pixels, and subsequent deblocking of 16×16 block edges of the film grain image.

Thus, a need exists for a film grain simulation technique that overcomes the prior disadvantages by providing greater efficiency.

BRIEF SUMMARY OF THE INVENTION

Briefly, in accordance with a preferred embodiment of the present principles, a method is provided for simulating film grain. The method commences upon the receipt of image information and the receipt of film grain information that includes at least one parameter among a set of possible parameters specifying different attributes of the film grain previously in the image. Using a film grain model, grain simulation occurs in accordance with the at least one parameter which is scaled in accordance with a target, pixel block size for pixel blocks in the image. The simulated film grain is then merged into the image.

Scaling the film grain information in accordance with a target pixel block size allows for the use of arbitrary block sizes, which permits the use of conventional hardware elements to perform the block-based operations associated with film grain simulation.

BRIEF DESCRIPTION OF THE DRAWINGS

FIG. 1 depicts a block schematic diagram of a system for simulating film grain;

FIG. 2 depicts a flow chart that shows the steps of a method by which the system of FIG. 1 generates film grain information in accordance with a first aspect of the present principles;

FIG. 3 depicts a flow chart that shows the steps of a method by which the system of FIG. 1 generates film grain information in accordance with a second of the present principles;

DETAILED DESCRIPTION

Figure 4:
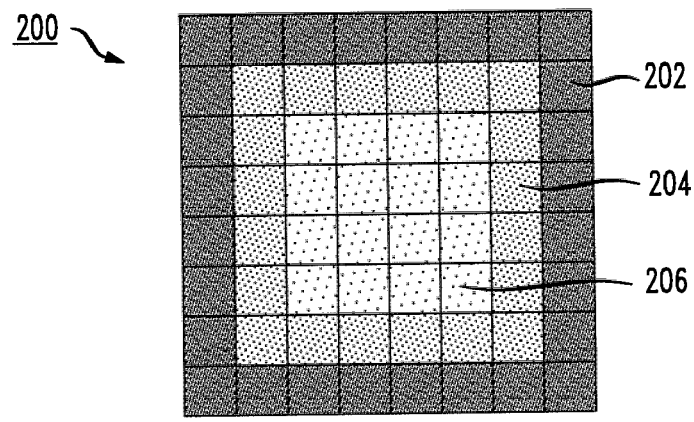
FIG. 4 depicts an example of an 8×8 pixel block scaled in accordance with the present principles.

FIG. 1 depicts a block schematic diagram of a system 10 for simulating film grain in an image. The system 10 comprises a first block 12 for generating film grain information from both an input image 104, and from at least one film grain parameter embodied in a film grain message, such as SEI message 106. The film grain generator block 12 generates film grain information from such input information using one of the methods of FIGS. 2 and 3 described in greater detail below. The film grain information generated by the film grain generator block 12 undergoes deblocking by a film grain deblocking filter 14 before receipt at a blending block 16. The blending block 16 blends the filtered film grain information with the input image to yield an output image containing film grain.

FIG. 2 depicts a flow chart illustrating the steps of a method in accordance with a first aspect of the present principles for film grain generation. As described in greater detail below, the method of FIG. 2 operates to generate the film grain from Gaussian noise scaled prior to frequency filtering. The film grain generation method of FIG. 2 commences upon execution of step 100 during which the system variables undergo initialization. Following step 100, extraction of successive N×M pixel blocks from the input image 104 occurs, with N and M each being integers greater than zero.

Following step 102, step 105 occurs and a noise generator (not shown) within the film grain generator block 12 of FIG. 1 generates random (Gaussian) noise in accordance with at least one of the film grain parameters contained in the SEI message 106 that accompanies the input image, as scaled in the manner discussed below. As adopted in the H.264 compression standard, the film grain parameters in the SEI message 106 are predicated on a 16×16 pixel block. Such a block size does not always afford the greatest convenience in terms of implementation efficiency.

In accordance with the present principles, the film grain parameters in the SEI message undergo scaling during step 107 to allow simulation of film grain with block sizes other than 16×16 pixels. In practice, the SEI message defines various film parameters, including, two sets of cut frequencies, namely the horizontal and vertical low cut frequencies and the horizontal and vertical high cut frequencies. To appreciate the manner in which the SEI parameters, and in particular, the horizontal and vertical high cut and low cut frequencies, undergo scaling, let $N_s \times M_s$ represent the original block size (i.e., 16×16 pixels), and let $N_t \times M_t$ represent the target block size on which the new scaled parameters will operate. The horizontal and vertical high cut frequencies undergo scaling as follows:

$$f_t^{HH} = ceil\left(\frac{N_t}{N_s} f_s^{HH}\right) \quad (1)$$

$$f_h^{HH} = ceil\left(\frac{M_t}{M_s} f_s^{HV}\right) \quad (2)$$

with the function f ceil (x) returning the smallest integer larger or equal than x, $f_t^{HH}$ is the new high horizontal cut frequency and $f_t^{HV}$ is the new high vertical cut frequency for use with the target block size. This scaling constitutes the equivalent of dividing the original frequency by the ratio of block sizes and rounding up to the nearest integer. Analogously, the horizontal and vertical low cut frequencies undergo scaling as follows:

$$f_t^{LH} = floor\left(\frac{N_t}{N_s} f_s^{LH}\right) \quad (3)$$

$$f_t^{LV} = floor\left(\frac{M_t}{M_s} f_s^{LV}\right) \quad (4)$$

where floor (x) returns the greatest integer smaller or equal than x, $f_t^{LH}$ is the new low horizontal cut frequency and $f_t^{LV}$ is the new low vertical cut frequency to be used with the target block size. This scaling constitutes the equivalent of dividing the original frequency by the ratio of block sizes and rounding down to the nearest integer.

The above-described rounding yields the most similar film grain on the target block size as compared to the film grain resulting from using the original cut frequency values defined on blocks of 16×16 pixels. However, any type of rounding (floor, ceil or nearest integer) could (also scale both horizontal and vertical cut frequencies.

In the illustrated embodiment, the original blocks are 16×16 pixels and the target blocks are 8×8 pixels. Under such circumstances, the scaling of the high cut frequencies can occur as follows:

$$f_t^H = (f_0^H + 1) >> 1 \quad (5)$$

where $f_t^H$ represents the new high cut frequency. Equation (5) can scale both horizontal and vertical high cut frequencies because source and target blocks are squared. The scaling of the low cut frequencies becomes:

$$f_t^L = f_0^L >> 1 \quad (6)$$

where $f_t^L$ represents the new low cut frequency. Analogously, equation (6) can scale both horizontal and vertical low cut frequencies.

The parameters of the SEI message can undergo scaling to any desired block size, allowing efficient implementation of the film grain simulation algorithms described previously. In the illustrated embodiment, scaling the film grain parameter values to 8×8 pixel blocks, allows the reuse of many existing integrated circuits for performing hardware accelerated Discrete Cosine Transform (DCT), Inverse Discrete Cosine Transform (IDCT) and other block-based operations.

During step 108, the random noise undergoes scaling to change the pixel values of the N×M pixel block that is already in the final size (for instance, 8×8) to avoid/reduce the complexity of the deblocking process. The scaling that occurs during step 108 takes the form of modifying the variance of the noise with respect to the value (as scaled) specified in the SEI message. Assume that for a given block B, the random noise generated during step 105 has a mean μ and variance σ². Given the scaling function $S_B$, defined for each pixel of the block B, the scaled pixel value will have the following relationship:

$$B_{scaled}(i,j)=(B(i,j)-\mu)\cdot S(i,j)+\mu \quad (7)$$

where B(i, j) represents the pixel at coordinates (i, j) of block B. Observe that Equation (7) only applies to those pixels where S(i, j) is not 1.

The noise scaling that occurs during step 108 obviates the need for a deblocking filter in order to reduce blocking artifacts. The use of noise scaling to reduce such artifacts makes use of the principle that blocking artifacts arise as a result of uncorrelated pixels across block edges. To reduce such artifacts, the correlation across bock edges has to be increased, which is equivalent to reducing the amount of noise on block edges.

Follow step 108, the scaled random noise undergoes a Discrete Cosine Transform during step 110. Thereafter, the coefficients become frequency filtered during step 112 in accordance with a corresponding filter parameter in the SEI message 106. An Inverse Discrete Cosine Transformation (IDCT) is performed during step 114. During step 116, a check occurs to determine whether additional N×M pixel blocks remain unread. If no further blocks remain, the resultant noise forms a film grain image 118, and the process ends during step 120. Otherwise, step 102 and those following it undergo re-execution until no further unread N×M blocks remain from the input image 104.

FIG. 3 depicts a flow chart illustrating the steps of a method in accordance with a second aspect of the present principles for film grain generation. The film grain generation method of FIG. 3 includes many of the same steps as the method of FIG. 2 and like numbers appear in FIG. 3 to reference like steps. The film grain generation method of FIG. 3 differs from the method of FIG. 2 with regard to the occurrence of noise scaling. As described, the film generation method of FIG. 2 undertakes noise scaling during step 108 as a prelude to the frequency filtering that occurs during step 112. In contrast, the film generation method of FIG. 3 undertakes noise scaling during step 115 subsequent to the Inverse Discrete Cosine Transform that occurs during step 114, after the frequency filtering performed during step 112. The scaling operation applied to each pixel of the filtered random noise during step 115 of FIG. 4 occurs in the equivalent manner prescribed by Equation (7).

Specification of the scaling function can occur a priori or can occur automatically, based on the parameters of the SEI message 106 and on the block size. The scaling function could also adapt to the different sets of parameters specified in the SEI message.

In the illustrated implementation, the scaling function reduces the amount of noise on the block edges (to avoid blocking artifacts) while at the same time increasing the amount of noise inside the block in order to keep the same overall amount of noise. With scaling particularized to 8×8 pixel blocks, the scaling function can achieve the result shown in FIG. 4 for pixel block 200. The darkest gray area 202 on the edge of pixel block 200 represents a reduction in the noise (S(i, j)<1), whereas the lightest gray area 204 inside the block represents an increase in the noise (S(i, j)>1). The mid gray region 206 represents no change in the noise intensity (S(i, j)=1).

Figure 5A:
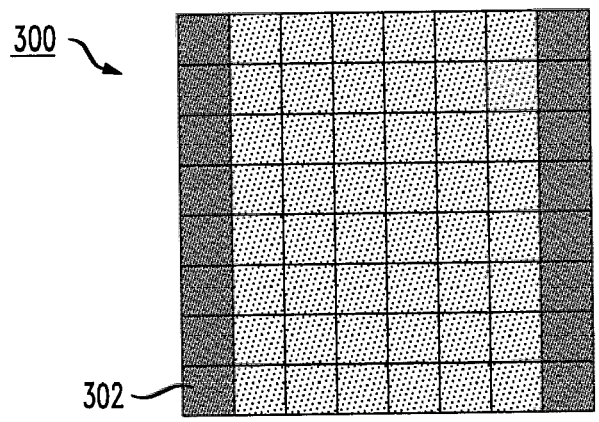
FIG. 5A depicts an example of an 8×8 pixel block whose vertical edges only undergo scaling.
Figure 5B:
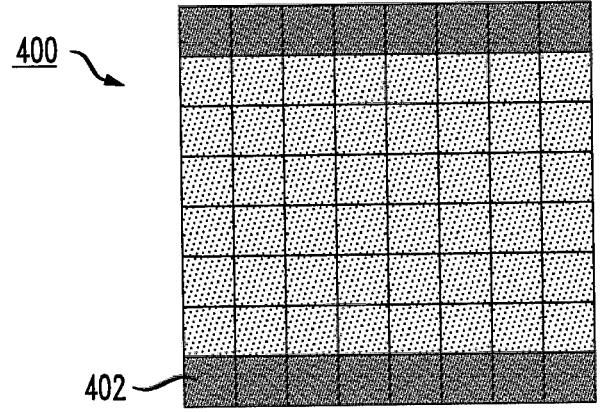
FIG. 5B depicts an example of an 8×8 pixel blocked whose horizontal edges only undergo scaling.

The use of the scaling function constitutes a tradeoff between maintaining the film grain appearance (since the parameters of the SEI message are changed) and reducing decoder complexity (i.e., avoid deblocking). In cases where not all block edges are equally relevant, the scaling function could modify only certain edges. On CRT displays, for instance, artifacts on vertical edges appear much more visible than on horizontal edges. Under such circumstances, reduced noise intensity should occur only on vertical edges 302 of pixel block 300, as shown in FIG. 5A. Under certain circumstance, the scaling function could modify only horizontal edges 402 of pixel block 400, as illustrated in FIG. 5B.

The foregoing describes a technique for simulating film grain in a coded image following decoding by scaling the film grain parameters to reduce complexity.

The invention claimed is:

1. A method for simulating film grain comprising the steps of:
   receiving image information;
   receiving film grain information that includes horizontal and vertical cut frequencies specifying at least one attribute of the film grain previously in the image; and
   simulating the film grain in accordance with the horizontal and vertical cut frequencies scaled to the nearest lower and higher integers, respectively, the scaling in accordance with a target pixel block size for pixel blocks in the image containing the film grain to be simulated.

2. The method according to claim 1 wherein:
   the step of receiving the film grain information further comprises the step of receiving an image whose bit stream has been compressed in accordance with a predetermined compression standard and
   the step of receiving the film grain information further comprises the step of receiving additional data embedded in the image bit stream.

3. The method according to claim 2 wherein:
   the step of receiving the film grain information further comprises the step of receiving an image whose bit stream has been compressed in accordance with the H.264 compression standard and
   the step of receiving the film grain information further comprises the step of receiving an SEI message.

4. The method according to claim 2 further comprising the step of scaling the film grain information with a target block size of $N_t \times M_t$ pixels, where $N_t$ and $M_t$ are not 16.

5. The method according to claim 2 further comprising the step of scaling the film grain information with a target block size of 8×8 pixels.

6. The method according to claim 1 wherein the step of simulating the film grain includes the steps of:
   generating random noise in accordance with the at least one parameter; and
   scaling the noise to change the pixel values of the pixel blocks previously scaled to the target block size;
   frequency filtering the noise after scaling.

7. The method according to claim 1 wherein the step of simulating the film grain includes the steps of:
   generating random noise in accordance with the at least one parameter; and
   frequency filtering the noise; and
   scaling the frequency-filtered noise to change the pixel values of the pixel blocks previously scaled to the target block size.

8. The method according to claim 4 wherein the noise undergoes scaling to reduce noise intensity primarily on vertical edges.

9. The method according to claim 4 wherein the noise undergoes scaling to reduce noise intensity primarily on horizontal edges.

10. A method for simulating film grain, comprising the steps of
  (a) receiving image information representative of an image from which film grain has been at least attenuated;
  (b) receiving film grain information that includes horizontal and vertical cut frequencies specifying at least one attribute of the film grain previously in the image;
  (c) scaling the horizontal and vertical cut frequencies to the nearest lower and higher integers, respectively, for target pixel blocks in the image containing the film grain to be simulated when the blocks have a size different from 16×16 blocks;
  (d) reading a successive one of pixel blocks of the image;
  (e) generating random noise for the successive pixel block in accordance with the at least one attribute;
  (f) scaling the random noise to change the pixel values of the pixel blocks previously scaled to the target block size;
  (g) performing a block-based transform on the scaled noise to yield a set of coefficients;
  (h) frequency filtering the coefficients; and
  (i) performing an inverse block-based transform on the frequency filtered coefficient to yield a film grain image block.

11. The method according to claim 10 wherein the steps (d)-(i) are repeated until all pixel blocks in the image have been read.

12. The method according to claim 10 wherein the step of performing a block based transform further comprises the step of performing a Discrete Cosine Transform.

13. The method according to claim 12 wherein the step of performing a block based inverse transform further comprises the step of performing an Inverse Discrete Cosine Transform.

14. A method for simulating film grain, comprising the steps of
  (a) receiving image information representative of an image from which film grain has been at least attenuated;
  (b) receiving film grain information that includes horizontal and vertical cut frequencies specifying at least one attribute of the film grain previously in the image;
  (c) scaling the horizontal and vertical cut frequencies to the nearest lower and higher integers, respectively, for target pixel blocks in the image containing the film grain to be simulated when the blocks have a size different from 16×16 blocks;
  (d) reading a successive one of pixel blocks of the image;
  (e) generating random noise for the successive pixel block in accordance with the at least one attribute;
  (f) performing a block-based transform on the noise to yield a set of coefficients;
  (g) frequency filtering the coefficients;
  (h) performing an inverse block-based transform on the frequency filtered coefficient to yield a film grain image block; and
  (i) scaling the noise to change the pixel values of the pixel blocks previously scaled to the target block size.

15. The method according to claim 14 wherein the steps (d)-(i) are repeated until all pixel blocks in the image have been read.

16. The method according to claim 14 wherein the step of performing a block based transform further comprises the step of performing a Discrete Cosine Transform.

17. The method according to claim 14 wherein the step of performing a block based inverse transform further comprises the step of performing an Inverse Discrete Cosine Transform.

* * * * *